United States Patent

Grass

[11] Patent Number: 6,011,369
[45] Date of Patent: Jan. 4, 2000

[54] DEVICE AND METHOD FOR CONTROLLING WINDSCREEN WIPERS

[75] Inventor: Ansgar Grass, Offenburg, Germany

[73] Assignee: Robert Bosch GmbH, Stuttgart, Germany

[21] Appl. No.: 09/180,661

[22] PCT Filed: Feb. 17, 1998

[86] PCT No.: PCT/DE98/00454

§ 371 Date: May 12, 1999

§ 102(e) Date: May 12, 1999

[87] PCT Pub. No.: WO98/40252

PCT Pub. Date: Sep. 17, 1998

[30] Foreign Application Priority Data

Mar. 12, 1997 [DE] Germany ............ 197 10 099

[51] Int. Cl.[7] ............................................. G05B 5/00
[52] U.S. Cl. .................. 318/445; 318/443; 318/444; 15/250.16; 15/250.17; 15/250.13
[58] Field of Search ........................ 318/443, 444, 318/445; 15/250.16, 250.17, 250.13

[56] References Cited

U.S. PATENT DOCUMENTS 4,309,646  1/1982  Liedtke et al. .................. 318/443
4,866,357  9/1989  Miller .

FOREIGN PATENT DOCUMENTS 29 22 160   12/1980  Germany .
44 17 371   11/1995  Germany .
4-224442     8/1992  Japan .
9-301131    11/1997  Japan .

*Primary Examiner*—Karen Masih
*Attorney, Agent, or Firm*—Kenyon & Kenyon

[57] ABSTRACT

Windshield wiper mechanism and method for precisely placing a wiper in each reversing position during wiper operation. The local wetness conditions on the windshield after deactivating the motor are taken into account from braking until reaching the reversing positions. The mechanism also includes a pulse generator for generating pulses as a function of the wiper movement, with these pulses being supplied to a controller via a signal input in order to control the motor. The pulses characterizing deceleration of the wiper from the time the motor is deactivated prior to a reversing position until it comes to a standstill are counted by a counter. The controller emits a switching signal for deactivating the motor and/or for reversing its direction of rotation prior to reaching the next reversing position or parking position as a function of the counted deceleration pulses.

6 Claims, 2 Drawing Sheets

DEVICE AND METHOD FOR CONTROLLING WINDSCREEN WIPERS

FIELD OF THE INVENTION

The present invention relates to a mechanism and method for controlling windshield wipers.

BACKGROUND INFORMATION

German Patent Application No. 29 22 160 describes a wiper system for operating the wipers of motor vehicles in which a correcting quantity characterizing wiper deceleration after turning off the operating switch or deactivating the motor is derived from a switching signal characterizing the angular velocity of the motor in an evaluation circuit. Taking this correcting quantity into account, the evaluation circuit emits a switching signal while the wiper is in different angular positions in order to place the wiper in a parking position as soon as the operating switch is turned off.

Using a rotational speed sensor having a first counter and a clock generator having a second counter, this arrangement starts counting from the time the wiper enters a parking zone until the counts of both counters are identical. The switching signal is then emitted for deactivating the motor. The wiper motor is deactivated earlier at high wiping speeds than at lower wiping speeds.

The disadvantage of this arrangement is that it always measures the wiping speed in a region (or parking zone) prior to the parking position or before the motor is deactivated. In addition, wiper motion is no longer detected after the motor is deactivated. This means that the wiper system dynamics are measured while the motor is energized. However, local wetness conditions on the windshield are variable. This makes it difficult to maintain the parking position solely by deriving the correcting quantity from the angular velocity of the motor.

A further disadvantage of this arrangement is that this wiper system merely places the wipers in the parking position. It does not enable the wipers to maintain the reversing positions during operation.

The use of a contact disc and a rotational speed sensor, which make the arrangement more expensive, is another disadvantage.

SUMMARY OF THE INVENTION

The present invention has the advantage that the wipers can be stopped precisely at preset points in each reversing position during wiper operation. This takes into account the local conditions on the windshield before and up to the reversing position after deactivating the motor prior to reaching these positions. To do this, a counter counts the deceleration pulses after deactivating the motor prior to a reversing position until the motor or wiper comes to a standstill. In other words, the wiper system dynamics are determined during braking after the motor has been deactivated.

A further counter, which counts path pulses over the entire wiping area, thereby allowing each wiper position to be assigned to a specific count, is especially advantageous.

The path pulses and deceleration pulses can be advantageously detected by a single counter.

The counter is also advantageously reset and calibrated as the wiper moves into its parking position.

The simple layout of the mechanism, which does not have a position switch or similar device, results in cost savings, which also expands the ways in which the p.c. board can be designed.

Alternatively, the fact that the windshield wiper mechanism is also suitable for placing the wiper in a parking position without a stop after turning off an operating switch is advantageous.

DETAILED DESCRIPTION

Figure 1:
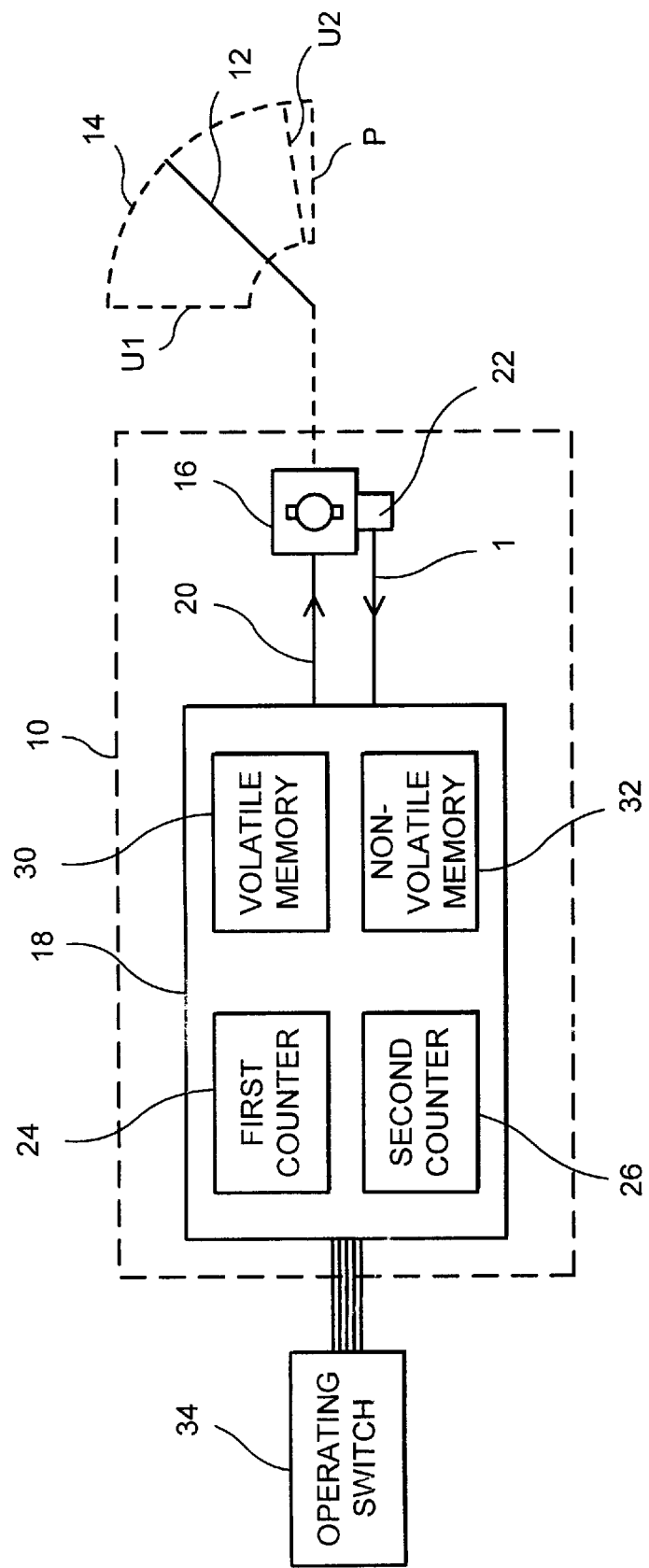
FIG. 1 shows a mechanism for controlling a windshield

FIG. 1 shows a windshield wiper mechanism 10 for a motor vehicle windshield wiper system having a wiper 12 which wipes a wiping area 14 of a windshield (not illustrated). Wiping area 14 is delimited by a first reversing position U1 and a second reversing position U2 or a parking position P of wiper 12. An operating switch 34 is pressed in order to turn windshield wiper mechanism 10 on and off or to select a wiping mode. When windshield wiper mechanism 10 is turned off, wiper 12 is usually placed in parking position P. Wiper 12 is operated by a reversible motor 16 controlled by switching signals 20 of a controller 18. A microcontroller, for example, is used as controller 18. On reversible motor 16 a double relay is arranged in an conventional manner whose two relays can be switched to ground or forward voltage independently of one another by switching signals 20 of controller 18, thereby braking or short-circuiting motor 16 or energizing it in one of two directions.

A pulse generator 22, whose pulses I are supplied to controller 18, is assigned to motor 16. Pulse generator 22 is implemented so that a ring magnet, which rotates together with the armature shaft of motor 16, emits a known number of pulses I per armature rotation at one or more stationary Hall sensors. This pulse sequence is input via an interrupt input on the microcontroller, which has a first counter 24 and a second counter 26 for evaluating the interrupts triggered by pulses I as well as a volatile memory 30 and a non-volatile memory 32.

Operating switch 34 is connected to controller 18 by a multicore cable and can have multiple means for selecting different wiping modes of wiper 12: for example, intermittent wiping, continuous wiping, or automatic mode if a rain sensor which detects the degree of windshield wetness is used.

First counter 24 continuously counts pulses I emitted by pulse generator 22 so that these pulses I, referred to as path pulses Iw, are assigned to the rotations of the armature shaft of motor 16 and thus indirectly to the path of wiper 12. Parking position P of wiper 12 is assigned to a count of zero for first counter 24. When wiper 12 moves toward first reversing position U1, first counter 24 adds up path pulses Iw, i.e. first counter 24 is incremented. Upon reaching first reversing position U1, the count takes on a preset setpoint Iw(U1) of 180 increments (Ink) for example, with motor 16 being previously deactivated in a timely manner. When wiper 12 moves back to second reversing position U2, the count decreases depending on the number of pulses I emitted by pulse generator 22. In second reversing position U2, the first counter therefore has a setpoint Iw(U2), which is also preset and is considerably smaller than the setpoint of first reversing position Iw(U1)=180 Ink, but greater than the count Iw(P)=0 Ink assigned to parking position P: Iw(U2)=40 Ink, for example. In this case as well, motor 16 is deactivated and braked ahead of time by controller 18.

Second counter 26, counts pulses I emitted by pulse generator 22 only from the time at which motor 16 is deactivated or short-circuited by a switching signal 20 of controller 18 prior to a reversing position U1, U2. Motor 16 does not then come to an immediate standstill, but merely slows down. Pulses I, which are emitted during this deceleration until motor 16 or wiper 12 comes to a standstill, are detected by second counter 26. These pulses I are referred to below as deceleration pulses In. Second counter 26 is always incremented and is then reset upon reaching each reversing position U1, U2 as motor 16 is deactivated.

Figure 2:
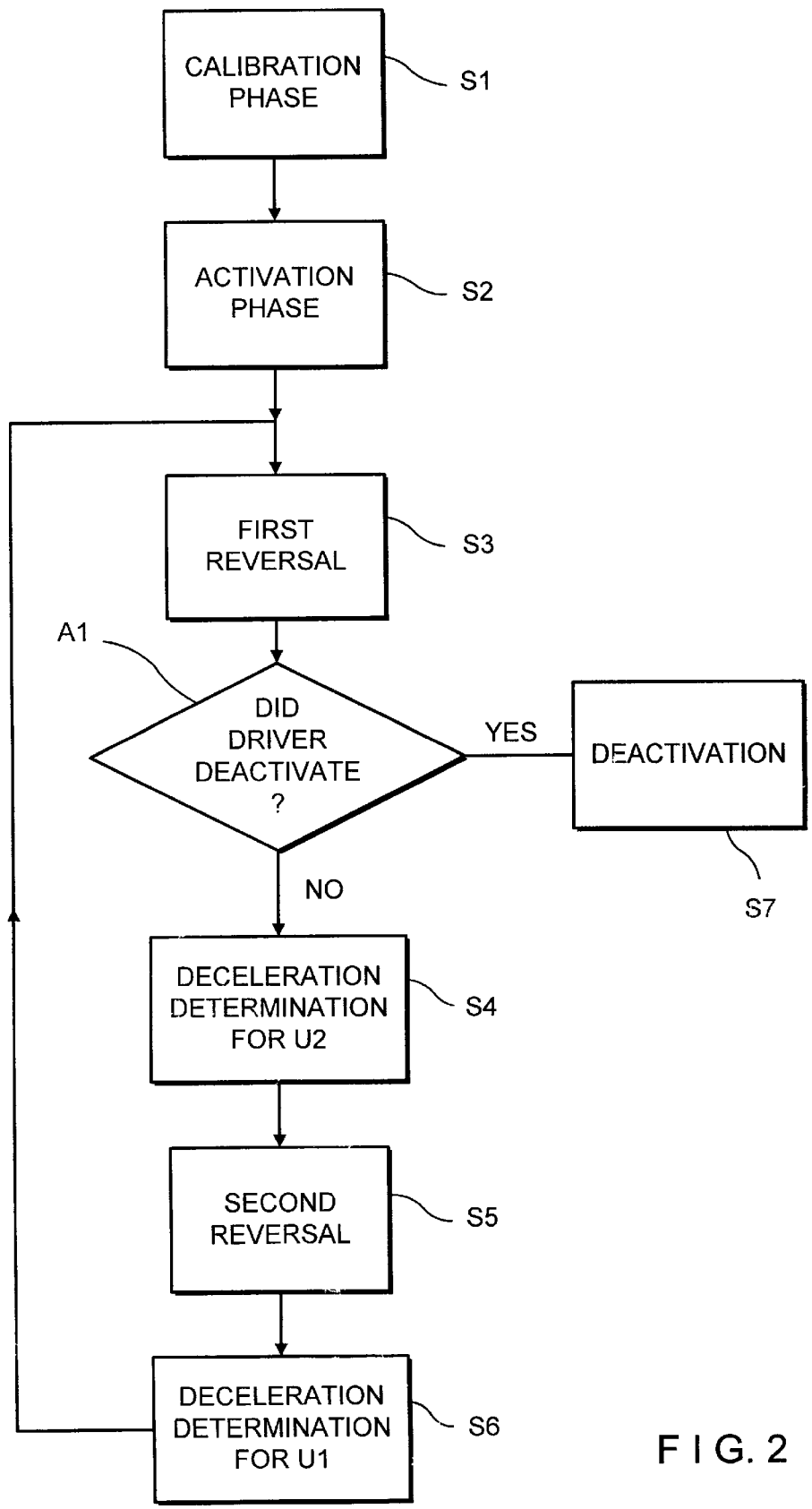
FIG. 2 is a flow chart illustrating the operation of the windshield wiper mechanism according to the present invention. wiper in accordance with the present invention.

In a flowchart including steps S1 through S7 and branch A1, FIG. 2 shows the operation of windshield wiper mechanism 10 illustrated in FIG. 1, as explained below.

S1 (calibration phase):

When the vehicle driver starts up windshield wiper mechanism 10, for example by selecting continuous wiping mode on operating switch 34, controller 18 sends a calibration signal 20 to the double relay, energizing motor 16 in the direction of parking position P. In this position, wiper 12 is stopped by the mechanical stop. As a result, motor 16 continues to be energized, while motor 16 remains at a standstill (no pulses I within a period of 20 ms, for example). Controller 18 detects this state and resets first counter 24 (calibration).

A start switching signal 20 then energizes motor 16 in the other direction, so that wiper 12 leaves parking position P, sweeps past second reversing position U2, and moves on in the direction of first reversing position U1. Pulse generator 22 detects the rotations of the armature shaft of motor 16 and thus generates a certain number of pulses I per armature shaft rotation, sending them to controller 18.

Controller 18 also activates first counter 24, using the same start switching signal 20, so that this counter subsequently adds up all pulses I emitted by pulse generator 22 and converted to interrupts.

S2 (activation phase):

Motor 16 must be deactivated or short-circuited by controller 18 early enough to stop wiper 12 the first time wiper 12 approaches first reversing position U1 and to reliably prevent wiper 12 from sweeping past reversing position U1. To do this, a preset number of pulses Iv, corresponding to the maximum number of deceleration pulses allowed for the current wiper system, is stored in non-volatile memory 32. Preset number of pulses Iv is subtracted from setpoint Iw(U1) for first reversing position U1, which is also stored in non-volatile memory 32, thereby defining a count Ia(U1) at which motor 16 is deactivated prior to first reversing position U1. When first counter 24 reaches count Ia(U1) calculated by controller 18, a first switching signal 20 begins deactivating motor 16 (both relays are set to ground). This guarantees that wiper 12 will always stop on time when starting up the windshield wiper mechanism during the activation phase.

For example, if Iw(U1)=180 Ink and Iv=30 Ink, wiper motor 16 is deactivated as soon as the count for first counter 24 reaches the value Ia(U1)=Iw(U1)−Iv=150 Ink.

Likewise, first switching signal 20 is used to activate second counter 26. This counter counts deceleration pulses In(U1) until motor 16 comes to a standstill. The standstill is detected when no pulses I (or interrupts) occur within the period of time defined in controller 18. Example: In(U1)=25 Ink.

First counter 24 continues to count the pulses without interruption, independently of second counter 26.

S3 (first reversal):

A second switching signal 20 of controller 18 now begins the process of reversing the rotational direction of motor 16, once a motor 16 standstill has been detected. This energizes a relay so that motor 16 moves in the opposite direction and wiper 12 travels to second reversing position U2. This second switching signal 20 is also used to set first counter 24 so that it subtracts all further pulses I from its current maximum count. In addition, count In(U1) of second counter 26, which characterizes the deceleration of wiper 12 at reversing position U1, is written to volatile memory 30, and second counter 26 is subsequently reset to zero by controller 18.

A1:

If in the meantime the motor vehicle driver presses operating switch 34 in order to turn off windshield wiper mechanism 10, controller 18 takes this fact into account at this point and goes on to step S7 instead of step S4.

S4:

Controller 18 continuously accesses the number of deceleration pulses In(U1)=25 Ink of second counter 26 stored in volatile memory 30 as well as the current count of path pulse Iw of first counter 24 and uses a third switching signal 20 to deactivate motor 16, short-circuiting the motor prior to second reversing position U2 when the count of first counter 24 reaches the value Ia(U2)=Iw(U2)+In(U1)=65 Ink. Volatile memory 30 is also erased.

Third switching signal 20 is also used to reactivate second counter 26, which is incremented by deceleration pulses In(U2) of motor 16 until the latter comes to a standstill, for example In(U2)=20 Ink. Based on the previously counted number of deceleration pulses In(U1) and the rain intensity which remains unchanged within the short period of half a wiper cycle (for example, 500 to 600 ms at level 1 in continuous wiping mode), motor 16 and wiper 12 come to a standstill immediately upon reaching second reversing position U2.

Independently of second counter 26, first counter 24 continues to subtract pulses I from its count, resulting in count Iw(U2)=40 Ink when wiper 12 reaches its second reversing position U2.

S5 (second reversal):

A fourth switching signal 20 of controller 18 reactivates motor 16 at second reversing position U2, with motor 16 reversing its direction of rotation, so that wiper 12 once again moves in the direction of first reversing position U1. Counted deceleration pulses In(U2)=20 Ink of second counter 26 are subsequently written to volatile memory 30 and the count reset to zero. Fourth switching signal 20 is also used to once again switch first counter 24 so that it again adds up pulses I.

S6:

Before reaching first reversing position U1, motor 16 is again deactivated by first switching signal 20 (see step S2 above). This time, unlike in step S2, a number of deceleration pulses In(U2)=20 Ink, counted just a short while before, was stored in volatile memory 30; therefore, controller 18 can now access this information and emit first switching signal 20 when the count of first counter 24 corresponds to the value Ia(U1)−Iw(U2)−In(U2)=160 Ink. In addition, volatile memory 30 is cleared again.

At this point, the procedure goes on to step S3.

S7 (deactivation):

If the vehicle driver turns off windshield wiper mechanism 10 in one of steps S2 through S6, wiper 12 moves past second reversing position U2 upon reaching step S3 and approaches parking position P, where it is stopped by the mechanical stop. Since motor 16 continues to be energized, and, at the same time, no pulses I are detected during the period mentioned above, controller 18 resets first counter 24.

In an improved embodiment, only one counter 24 is used for measuring path pulses Iw and deceleration pulses In because counts Ia(U1) and Ia(U2) for deactivating motor 16 are each temporarily stored in volatile memory 30. The differences between the counts upon motor deactivation Ia(U1), Ia(U2) and upon motor 16 coming to a standstill at the two reversing positions Iw(U1), Iw(U2) are formed and temporarily stored as deceleration pulses In(U1), In(U2). As described above, calculated deceleration pulses In(U1), In(U2) are used to calculate the count for deactivating the motor Ia(U1), Ia(U2) in next reversing position U1, U2. Counter 24 therefore counts path pulses Iw continuously and is reset, i.e., calibrated by controller 18 only upon activation and deactivation of windshield wiper mechanism 10 when wiper 12 is in parking position P.

As an alternative to this embodiment, path pulses Iw are not counted continuously, but rather only in sections of wiping area 14, preferably close to reversing positions U1, U2. In this case, counting begins only after the emission of a contact signal, for example by one or more touch-sensitive switches. The touch-sensitive switch can be implemented in the form of a contact disc on the motor spur gear with a contact finger mounted on the p.c. board of controller 18. This makes it unnecessary to calibrate (first) counter 24 in parking position P, since this counter is always activated by the contact disc at one ore more defined points.

Because (first) counter 24 is calibrated via a further touch-sensitive switch or an absolute-value generator in wiping area 14, wiper 12 can be placed in parking position P just as it was in the procedure described above. This method prevents mechanical stopping of wiper 12 in parking position P.

Switching between the different wiping modes, e.g. intermittent wiping, continuous wiping, and automatic mode, takes place in the known manner without interfering with the method according to the present invention or having an unwanted effect on the position of wiper 12 in reversing positions U1, U2. This also applies if a rain sensor is used.

What is claimed is:

1. A windshield wiper mechanism, comprising:
   at least one wiper moving back and forth between a first reversing position and a second reversing position, and having a parking position;
   a reversing motor controlling the at least one wiper;
   a pulse generator generating pulses as a function of movement of the at least one wiper;
   a controller controlling the motor, the pulse generator supplying the generated pulses to the controller, the controller including a first counter counting the pulses generated from a time the motor is deactivated until a time the at least one wiper comes to a standstill, the controller emitting at least one switching signal for at least one of deactivating the motor and reversing a direction of rotation of the motor as a function of the counted pulses counted prior to the at least the wiper reaching one of the first reversing position, the second reversing position, and the parking position.

2. The windshield wiper mechanism according to claim 1, wherein the controller includes a second counter counting the pulses generated while the at least one wiper moves over at least a portion of a wiping area.

3. The windshield wiper mechanism according to claim 1, wherein prior to reaching the first reversing position for a first time, the controller emits, as a function of one of the first counter and second counter counting a predetermined number of pulses, one of a switching signal for deactivating the motor and a switching signal for reversing the direction of rotation of the motor, the predetermined number being stored in the controller.

4. The windshield wiper mechanism according to claim 2, wherein the controller resets the second counter upon reaching the parking position when the pulse generator does not send any pulses to the controller while the motor continues to be energized.

5. The windshield wiper mechanism according to claim 1, wherein the pulse generator generates pulses as a function of a rotation of an armature shaft of the motor.

6. A method for operating a windshield wiper mechanism, comprising the steps of:
   moving, using a reversing motor, at least one wiper back and forth between a first reversing position and a second reversing position;
   generating pulses, using a pulse generator, as a function of movement of the at least one wiper;
   supplying the pulses to a controller controlling the motor;
   counting, using a first counter included in the controller, the pulses generated from a time the motor is deactivated until the at least one wiper come to a standstill; and
   emitting, as a function of the counted pulses, at least one switching signal by the controller for at least one of deactivating the motor and reversing a direction of rotation of the motor.

* * * * *